UNITED STATES PATENT OFFICE.

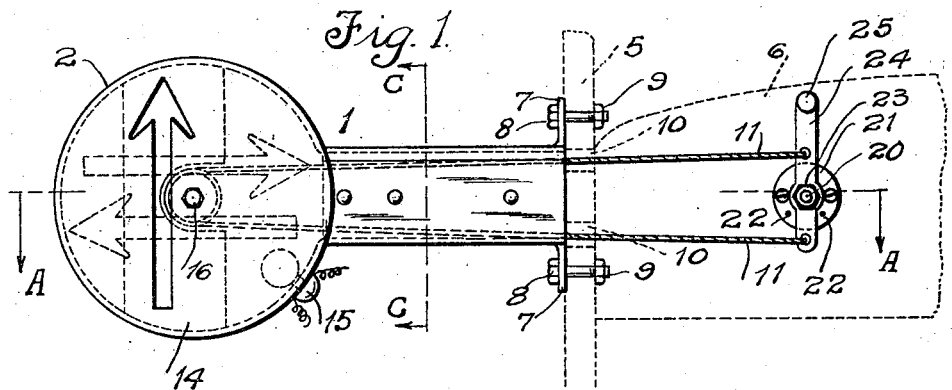
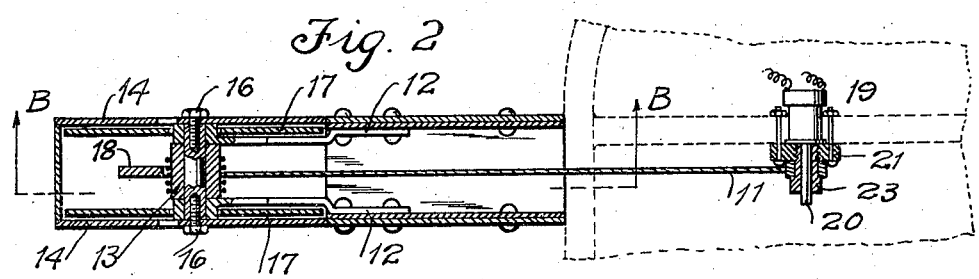
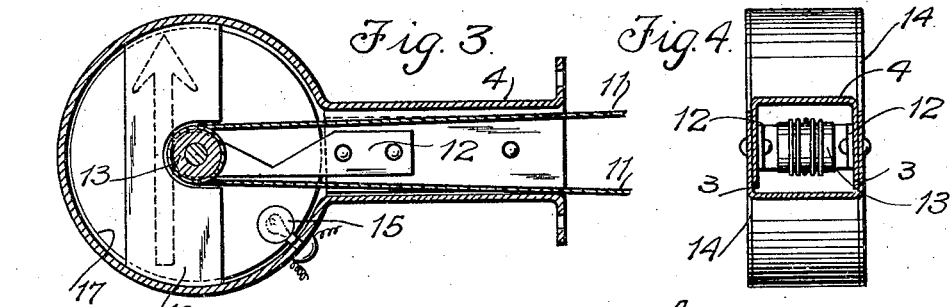
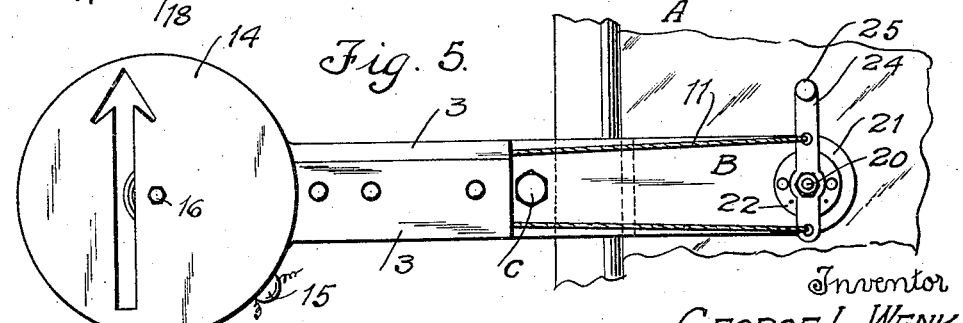

GEORGE L. WENK, OF MECHANICSBURG, PENNSYLVANIA.

VEHICLE SIGNAL.

1,418,042.    Specification of Letters Patent.    Patented May 30, 1922.

Application filed July 16, 1921. Serial No. 485,152.

*To all whom it may concern:*

Be it known that I, GEORGE L. WENK, a citizen of the United States, residing at Mechanicsburg, in the county of Cumberland and State of Pennsylvania, have invented certain new and useful Improvements in Vehicle Signals; and I do hereby declare the following to be a full, clear, and exact description of the invention, such as will enable others skilled in the art to which it appertains to make and use the same.

The object of the invention is the provision of a signaling device or means for automobiles or other vehicles which can be employed to notify or warn persons on foot or vehicle operators or occupants, both at the front and rear of the vehicle carrying the device what action is contemplated by the operator or occupant of such vehicle— whether he will turn to the left or right or decrease speed or bring his vehicle to a complete stop.

The invention consists in certain novelties of construction and in the combinations of parts as herein set forth and specified in the claims.

The accompanying drawing illustrates an example of the embodiment of the invention, the parts being constructed and combined according to the best of the several modes of procedure I have so far devised for the purpose; and two ways of attaching the device to automobiles, one a closed and the other an open car with a wind shield.

Figure 1 is an elevation view of the device as it appears when attached to a part of a closed car and projecting horizontally at the side thereof.

Figure 2 is a section of Figure 1 on the line A—A.

Figure 3 is a part vertical section of the device on the line B—B of Figure 2.

Figure 4 is a cross section of Figure 1 on line C—C.

Figure 5 is an elevation view showing the device attached to the wind shield of an open car.

Referring to the figures, the numeral 1 designates the frame or body of the device in the form of a hollow casing, preferably made by cutting to shape a piece of sheet metal, fashioning the central portion to form the part 2 of circular or cylindrical shape, and bending the edges 3 of the ends 4 and lapping them over each other to produce a hollow arm or extension; 5 and 6, in dotted lines, the wall and dash of a closed car; 7, perforated flanges integral with the part 4 to receive bolts 8 which are passed through the flanges and holes in the wall of the body and secured by nuts 9, as shown by Figure 1; 10, dotted lines, holes in the body for the passage of a wire cable 11, by which the movable parts of the signal are operated; and 12 are two arms, each perforated at one end to form a bearing and the opposite end secured in position by rivets or otherwise within the hollow extension.

The movable parts constituting the signal proper consist of a rotary drum 13 journaled within the perforations of the arms 12; two arrow disks 14 or disks each having an arrow-shaped opening through which light can pass from the electric lamp 15 suitably located within the frame or casing; and threaded bolts 16, 16 pass through holes in the centers of the disks and seated in threaded holes in the ends of the rotary drum, which bolts clamp the disks to the drum, the said disks being located outside the circular part 2, as shown.

Inside the disks are two red glass disks 17, 17 secured to the arms 12 or to the part 2 in any convenient way; or in lieu of said disks pieces of red glass may be secured to the disks 14 over the arrow-shaped opening. To prevent sunlight passing through an arrow opening in one disk and the red glass and out through the arrow opening in the opposite disk and giving a false signal a piece of opaque sheet metal 18 is secured at its ends to the interior surface of the cylindrical part 2, and in line with the arrow openings when in neutral positions.

The number 19 designates an electric switch of a well known type which is secured to the dash 7, the switch being provided with a movable button or stem 20, which when pushed inwardly lights the lamp 15 and when pushed inwardly a second time extinguishes the light in a well known way; 21, a metallic disk secured to the dash by screws or bolts, said disk having a threaded hole and two spaced stop pins 22 projecting from the surface of the disk; 23, a hollow threaded bolt screwed into the disk, the button or stem of the switch passing through said bolt and extended far enough to be operative; 24, an operating lever pivoted intermediate its ends between the dash and the head of the bolt 23 and limited in its movements by the stop pins; and 25 is a handle at one end of the lever.

The wire cable 11 is wound around the drum several times passed outwardly through the hollow extension or arm, and its free ends secured to the lever at opposite sides of the lever fulcrum.

Figures 1 to 4 show one way of attaching the device to a closed vehicle. It may be attached in other ways, depending upon the construction of the closed car.

Figure 5 shows one way of securing the device to an open car. In this instance A is a wind shield frame of any type; B, a metallic plate secured to the hollow arm or extension and on which plate the switch and lever are supported; and C a bolt of a clamp which secures the device in position on the frame of the wind shield.

The ways of securing the device to closed and open cars shown are for examples only, and other ways of attachment may be employed as occasion may demand without constituting substantial departures.

The mode of operating the device is substantially as follows:

When the parts occupy the relative positions as shown by Figure 1, full lines, the device is neutral. If the occupant or operator of the vehicle intends to stop or perhaps reduce speed, he presses the button of the switch and the arrow shows red pointing upwardly. If he intends to turn to the right, he pushes the button and turns the lever toward the right, which also turns the illuminated arrow toward the right. If he intends to turn toward the left, he presses the button and moves the lever and arrow toward the left. It will be recognized that I have provided a signaling device of a very simple character, easily and quickly operable as the lever and switch are located near the steering wheel, one which displays a similar signal both at the front and rear of the vehicle, and which is adapted for use on both open and closed vehicles.

What I claim is:

1. A hollow frame for a signaling device consisting of sheet metal, the metal being cut to form a blank having a narrow portion at the center and at opposite ends flanges 3, the central portion being bent to a cylindrical shape 2, and the flanges 3 turned over and overlapped to form a hollow arm or extension, and arms 12 having bearings at the ends secured to the hollow arm and extended to the center of the cylindical shaped part.

2. A signaling device comprising a casing having a cylindrical part 2 and a hollow arm, two arms 12, 12, with bearings at the ends secured to the hollow arm and with the bearings disposed at the center of the said cylindrical part, a rotary drum supported in the bearings of the arms, two disks with direction-indicating means, said disks being rigidly secured to opposite ends of the drum and outside the edges of the cylindrical part 2, colored glass arranged parallel with the disks, a lamp in the casing, means for rotating the disks and drum, and means for attaching the device to a vehicle.

3. The subject-matter of claim 2 when each of said rotary disks has an arrow-shaped opening in the body thereof and said disks are mounted with the arrow openings in line to rotate in parallel vertical planes so they can point upwardly and also alternately to the right and left.

4. The subject-matter of claim 2, with the addition of opaque means secured in line with the arrow openings when the arrows are in vertical positions for preventing passage of the sun's rays into one of the said openings and out through the other.

5. An actuator for a signal comprising a rotary drum, direction indicating disks carried by and rotatable with the drum, means for supporting the rotary drum and disks, a lever, a hollow bolt upon which the lever is fulcrumed, and a cable wound intermediate its ends upon the drum and the free ends of said cable secured to the lever on opposite sides of the fulcrum.

In testimony whereof I affix my signature.

GEORGE L. WENK.